United States Patent [19]

Shindo et al.

[11] 4,145,937
[45] Mar. 27, 1979

[54] HYDRAULIC CONTROL SYSTEM FOR USE IN AUTOMATIC TRANSMISSION

[75] Inventors: Yoshio Shindo; Hiroshi Ito, both of Toyota, Japan

[73] Assignee: Toyota Jidosha Kogyo Kabushiki Kaisha, Aichi, Japan

[21] Appl. No.: 827,028

[22] Filed: Aug. 23, 1977

[30] Foreign Application Priority Data

Apr. 28, 1977 [JP] Japan .................................. 52-48430

[51] Int. Cl.$^2$ ............................................ B60K 21/00
[52] U.S. Cl. ........................................ 74/867; 74/869
[58] Field of Search ....................... 74/861, 867, 869; 251/63, 63.4

[56] References Cited

U.S. PATENT DOCUMENTS

| | | | |
|---|---|---|---|
| 3,656,373 | 4/1972 | Shimosaki | 74/869 |
| 3,785,614 | 1/1974 | Enomoto | 74/869 X |
| 3,881,372 | 5/1975 | Miyauchi et al. | 74/867 |

*Primary Examiner*—Edgar W. Geoghegan
*Attorney, Agent, or Firm*—Toren, McGeady and Stanger

[57] ABSTRACT

A hydraulic control system for a vehicle automatic transmission includes: a first frictional engaging device operable for shifting to a low speed drive; a first hydraulic servo for the first frictional engaging device, a second frictional engaging device operable for shifting to a high speed drive; a second hydraulic servo for the second frictional engaging device; a throttle pressure control valve for delivering a throttle pressure associated with an opening of an intake throttle valve and the speed of the vehicle having the automatic transmission; and a shift valve for changing over a fluid path from the first hydraulic servo to the second hydraulic servo upon upshift of the transmission in response to the throttle pressure and a governor pressure of the system, and from the second hydraulic servo to the first hydraulic servo upon downshift of the transmission. This valve includes a valve element displaceable between a first position and a second position, and when the valve element is displaced a given distance from the first position towards the second position, a hydraulic pressure for the second hydraulic servo may be applied to the element, whereupon the governor-pressure-acting area of the valve element is increased, so that the valve element is displaced according to a snap action. Likewise, the valve element is displaced from the second position towards the first position according to a snap action, after being displaced a given distance.

2 Claims, 2 Drawing Figures

HYDRAULIC CONTROL SYSTEM FOR USE IN AUTOMATIC TRANSMISSION

BACKGROUND OF THE INVENTION

The present invention relates to an automatic transmission for a motor vehicle, and more particularly to a hydraulic control system for such an automatic transmission.

In the prior art, hydraulic control systems for use in automatic transmissions include a shift valve, which supplies a hydraulic pressure to a frictional engaging means in response to a throttle pressure (a pressure produced in response to an opening of an intake throttle valve) and a governor pressure (a pressure associated with a vehicle speed). In a shift valve (so called clutch-to-clutch shift valve) which is adapted to change over the delivery of hydraulic pressure from one frictional engaging means to another upon shifting of speeds, a governor pressure, a throttle pressure and a spring force act on a valve element in opposing relationship. The valve element of such a valve should preferably be shifted to a desired position, with a movement comprising or corresponding to a snap action, immediately after the connection of a port has been changed over. For insuring such a snap action movement for the shift valve, it has been a common practice to provide an arrangement, such that when the valve element is displaced a given distance, then a governor-pressure-acting area is increased to a considerable degree or that a pressure from a hydraulic servo is introduced so as to act on the valve element. However, these prior art attempts have suffered from several disadvantages.

First, in response to displacement of the valve element, a spring force is increased or decreased, so that due to the communication-lapping arrangement of a land, such a snap action can not likewise be attained for both upshift and downshift of the valve element when merely resorting to a change in governor-pressure-acting area. The result is that the valve element tends to make a stop half way through its movement, and then pressure is dropped to a level which depends on a balance in hydraulic pressure between supply and discharge sides. This leads to a failure to attain a desired shifting characteristic, and hence a seizure or abnormal wear of frictional engaging means results.

Secondly, in case a snap action is applied according to a servo pressure, then the degree of freedom of hysteresis between shifting lines of upshift and downshift is limited, thus resulting in a failure to provide an optimum speed-shifting characteristic in terms of the drive-feel which is produced.

Thus, it is a principal aim of the present invention to provide a shift valve for use in a hydraulic control system in an automatic transmission, which provides a desired snap action upon upshift and downshift.

SUMMARY OF THE INVENTION

According to the present invention, a hydraulic control system for use in an automatic transmission is provided which includes: first frictional engaging means operable when shifting to a low speed drive; a first hydraulic servo, to which a hydraulic pressure is supplied so as to operate the first frictional engaging means; second frictional engaging means operable when shifting to a high speed drive; a second hydraulic servo, to which a hydraulic pressure is supplied so as to operate the second frictional engaging means; a throttle pressure control valve delivering a throttle pressure associated with the opening of an intake throttle valve and vehicle speed; a governor pressure control valve for delivering a governor pressure associated with vehicle speed; and a shift valve having a valve element adapted to change over the supply of hydraulic pressure from the first hydraulic servo to the second hydraulic servo upon upshift, and from the second hydraulic servo to the first hydraulic servo upon downshift, in association with the throttle pressure and the governor pressure, respectively; the valve element being movable between a first position and a second position in a manner that when the valve element is displaced towards the first position the throttle pressure acts thereon, and when the valve element is displaced towards the second position the governor pressure and a pressure being supplied to the second hydraulic servo are applied thereto only when the aforesaid pressure is supplied to the second hydraulic servo, whereby when the valve element is displaced a given distance from the second position to the first position, the pressure being supplied to the second hydraulic servo acts on the valve element, whereuoon the governor-pressure-acting area of the valve element is increased.

According to another aspect of the present invention, there is provided a hydraulic control system for use in an automatic transmission with an arrangement similar to that described above, wherein when the valve element is displaced towards the first position, the element has applied thereto a throttle pressure and a pressure being supplied to the first hydraulic servo, only when the aforesaid pressure is supplied thereto; and when the valve element is displaced towards the second position, the element has applied thereto a governor pressure, whereby when the element in the shift valve is displaced a given distance from the second position towards the first position, the pressure being supplied to the first hydraulic servo may act on the element, whereupon a governor-pressure-acting area of the valve element is decreased.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
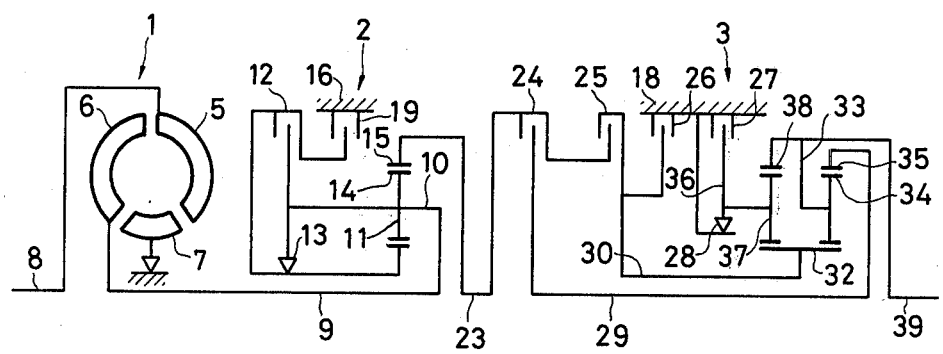
FIG. 1 is a diagrammatic view of the arrangement of a torque converter and a transmission gearing with which the present invention may be used.
Figure 2:
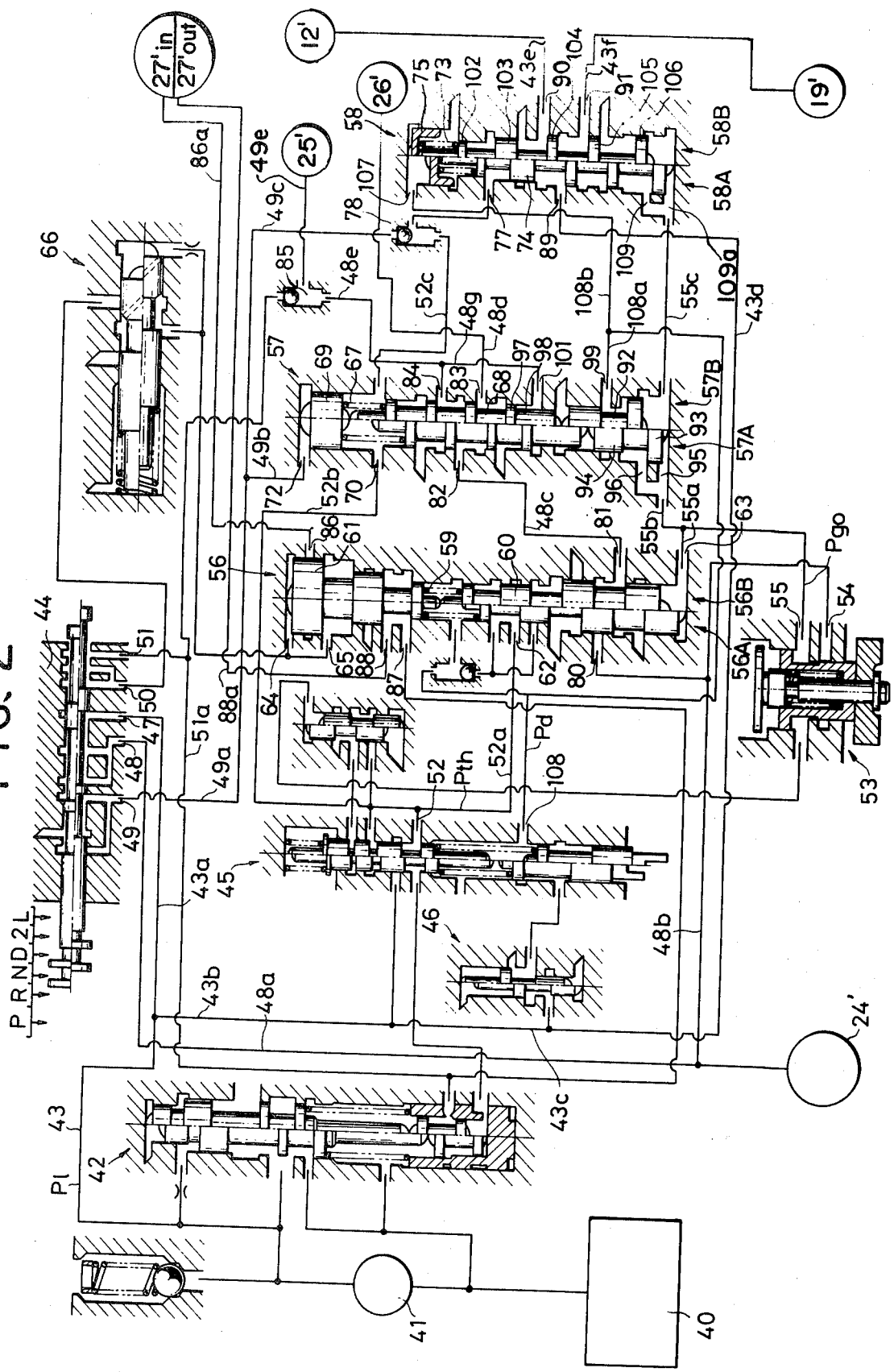
FIG. 2 is a schematic view of one embodiment of a hydraulic control system according to the present invention.

The hydraulic control system according to the present invention will now be described in more detail with reference to the accompanying drawings. FIG. 1 shows an outline of an arrangement of a hydrodynamic torque converter and transmission gearing. The automatic transmission includes a torque converter 1, overdrive mechanism 2, and three forward speed range drive and one rear drive change-gear mechanism 3, and is controlled by means of a hydraulic control system as shown in FIG. 2. The torque converter 1 is of a known type, which includes pump vanes 5, turbine vanes 6 and stator vanes 7. The pump vanes 5 are coupled to a crank shaft 8 of an engine, while the turbine vanes 6 are coupled to a turbine shaft 9. The turbine shaft 9 serves as an output shaft of the torque converter 1, as well as an input shaft of the overdrive mechanism 2, being coupled to a carrier 10 for a planetary gear set in the overdrive mechanism.

A planetary pinion 14 which is rotatably supported by the carrier 10 meshes with a sun gear 11 and a ring gear 15. Provided between the sun gear 11 and the carrier 10 are a multiple disc clutch 12 and a one-way clutch 13, while another multiple disc clutch 19 is provided between the sun gear 11 and a housing which houses an overdrive mechanism or an overdrive casing 16.

The ring gear 15 in the overdrive mechanism 2 is coupled to an input shaft 23 in the change-gear mechanism 3. Provided between the input shaft 23 and an intermediate shaft 29 is a multiple disc clutch 24. Still another multiple disc clutch 25 is provided between a sun gear shaft 30 and a transmission casing 18. A sun gear 32 mounted on the sun gear shaft 30 forms two-train planetary gear mechanisms in cooperation with the carrier 33, planetary pinion 34 carried by the carrier 33, a ring gear meshing with the pinion 34, another carrier 36, a planetary pinion 37 carried by the carrier 36, and a ring gear 38 meshing with the pinion 37. A ring gear 35 in another planetary gear mechanism is coupled to the intermediate shaft 29. The carrier 33 in this planetary gear mechanism is coupled to the ring gear 38 in another planetary gear mechanism, while these carrier and ring gears are coupled to an output shaft 39. In addition, a multiple disc clutch 27 and a one-way clutch 28 are provided between the carrier 36 and the transmission casing 18 in the other planetary gear mechanism.

With the automatic transmission having an overdrive mechanism thus arranged, engagement and release of respective clutches and brakes are effected in response to the load on an engine of the vehicle and to vehicle speed by means of the hydraulic control system, to be described in more detail hereinafter, thereby providing four forward speed range drives including an overdrive (O/D), and one reverse drive according to manual shifting.

The relationship among the change-gear positions, clutches and brakes is summarized in the following Table 1.

FIG. 2 shows a hydraulic circuit diagram of a hydraulic control system for the automatic transmission shown in FIG. 1. Oil which has been pumped up from an oil reservoir 40 by means of an oil pump 41 is fed to a line pressure control valve 42, which in turn delivers a line pressure Pl adjusted to a given pressure level, into a hydraulic line 43. The line pressure is then supplied via hydraulic line 43a to a manual shift valve 44, and via hydraulic lines 43b and 43c to a throttle pressure control valve 45 and a detent pressure control valve 46.

The manual shift valve 44, as is well known, includes a parking position (P), reverse drive position (R), neutral position (N), D-range drive position (D), 2-range drive position (2), L or 1-range drive position (L or 1), in which a line pressure supplied into an input port 47 thereof appears at output ports 48 to 51 selectively, in response to the positions of a valve spool. Table 2 below represents the relationship of hydraulic pressure versus ports in the varying shift positions of the valve 44.

Table 2

| Hydraulic line | Shift Position | | | | | |
|---|---|---|---|---|---|---|
| | P | R | N | D | 2 | L |
| 48 | | | | O | O | O |
| 49 | | | | | O | O |
| 50 | O | O | | | | O |
| 51 | | O | | | | |

The throttle pressure control valve 45 delivers a hydraulic pressure from its output port 52, which pressure is increased or decreased in response to the extent to which the accelerator pedal has been depressed, as well as to the degree of opening of the intake throttle valve. An output port 48 in the manual shift valve 44 is connected by a hydraulic line 48a to a hydraulic servo 24' in a forward clutch while a hydraulic line 48b branched therefrom is connected to an input port 54 in a governor pressure control valve 53. The governor pressure control valve 53 adjusts line pressure supplied to its input port 54 commensurate with vehicle speed, and delivers from an output port 55 a governor pressure Pgo commensurate with the vehicle speed.

The system includes a 1-2 shift valve 56, a 2-3 shift valve 57, and a 3-4 shift valve 58 (3 speed-overdrive shift valve). The 1-2 shift valve 56 includes two valve elements 60, 61 opposed in the axial direction through the medium of a compression coil spring 59.

The valve element 60 may be biased between a lower position shown at 56A and an upper position shown at 56B under the equilibrium between a downward force created by the spring 59 plus a throttle pressure Pth applied to a port 62 through the line 52a, and an upward Table 1

| shift position | frictional engaging means | | clutch 12 | clutch 24 | clutch 25 | brake 19 | brake 26 | brake 27 | one-way clutch 13 | one-way clutch 28 |
|---|---|---|---|---|---|---|---|---|---|---|
| parking | | | O | X | X | X | X | O | | |
| reverse drive | | | O | X | O | X | X | O | lock | lock |
| neutral | | | O | X | X | X | X | X | | |
| forward speed range | D-range drive | 1st | O | O | X | X | X | X | lock | lock |
| | | 2nd | O | O | X | X | O | X | lock | over-run |
| | | 3rd | O | O | O | X | X | X | lock | over-run |
| | | O.D. | X | O | O | O | X | X | over-run | over-run |
| | 2-range drive | 1st | O | O | X | X | X | X | lock | lock |
| | | 2nd | O | O | X | X | O | X | lock | over-run |
| | L-range drive | | O | O | X | X | X | O | lock | lock |

In Table 1, the symbol O represents the engaging condition of clutches and brakes, while the symbol X represents the release condition thereof.

force created by the governor pressure Pgo applied to a lower port 63 via line 55a. When the manual shift valve 44 is shifted to L - range drive position, a line pressure appearing at an output port 50 thereof is supplied via a low pressure modulator valve 66 to ports 64 and 65 of the valve element 61, so that the valve element 61 is shifted downwardly, thereby forcibly retaining valve element 60 in the lower position 56A. The valve element 60 controls the communication between an input port 80 and an output port 81.

The 2-3 shift valve 57 includes valve elements 92, 68, 69. Interposed between the valve elements 68 and 69 is a compression spring 67. The valve element 68 abuts the valve element 92. The valve element 92 has a land 93 and a land 94 of a cross sectional area smaller than that of land 93. The governor pressure Pgo is supplied via a line 55b to the ports 95, 96. The valve element 68 has a land 97 and a stem 98 at its lower end as shown in FIG. 2. The line pressure Pl is supplied via a line 48c to an input port 82 in the 2-3 speed shift valve 57, when the transmission remains in a drive range other than the first speed drive.

An output port 84 is connected via lines 48e, 49e to the hydraulic servo 25' in a multiple disc clutch 25 for the second speed drive, as well as to port 101 in the 2-3 speed shift valve 57 via a line 48g. An output port 83 is connected via line 48d to a hydraulic servo 26' for the third speed drive brake 26. A port 70 is supplied with a throttle pressure via a line 52b, while a port 72 is supplied with a line pressure Pl via a line 49b in the 2 - and L- range drives. A port 99 is supplied with a detent pressure Pd from an output port 108 in the throttle pressure control valve 45 via a line 108a, the detent pressure being adjusted in the detent pressure control valve 46. In this manner, the valve element 68 undergoes a downward force applied by the coil spring 67 and a throttle pressure from the port 70, and an upward force applied by the governor pressure from the port 95 or 96 and a pressure from the port 101, as viewed in the drawing. Thus, the input port 82 is communicated with the output port 83 (57A, lower position) or 84 (57B, upper position) depending on the predominance of one of the aforesaid two forces over the other. In the case of 2-range and L-range drives, a downward force from the port 72 is additionally applied to the valve element 68. In the case of kickdown, a downward detent pressure Pd from the port 99 is additionally applied to the valve element 68.

The 3-4 speed shift valve 58 includes a sleeve 75 and a valve element 74. A compression coil spring 83 is disposed between the valve element 74 and the sleeve 75. The valve element 74 includes, from the top downwardly as viewed in the drawing, a land 102, a land 103 having a cross sectional area larger than that of the land 102, and land 104 having a cross sectional area larger than that of the land 103, a land 105 having the same cross sectional areas as that of the land 104, and a land 106 having a cross sectional area larger than that of the land 105. The port 107 is supplied with a detent pressure Pd via a line 108b upon kickdown. A port 77 is provided midway between the lands 102, 103, and supplied with the line pressure Pl via line 49c and a shuttle valve 78 in the case of L- or 2- range drives. The port 77 is then supplied with a throttle pressure Pth via a line 52c and a shutter valve 78 in the case of a D- range drive. An input port 89 is provided midway between the lands 103 and 105, and supplied with the line pressure Pl via a line 43d. An output port 90 is provided midway between the lands 103 and 104 and connected via a line 43e to the hydraulic servo 12' for the multiple disc clutch 12 adapted to establish gear engagement in the overdrive mechanism. An output port 91 is provided midway between the lands 104 and 105, and connected via a line 43f to a hydraulic servo 19' for an overdrive multiple disc brake 19. Ports 109, 109a are supplied with a governor pressure via a line 55c.

Referring to the operation of the 2-3 speed shift valve, during the second speed drive, the governor pressure Pgo is relatively low, and hence the valve element 68 assumes the position 57A, or a lower position. In other words, the input port 82 is communicated with the output port 83, so that the hydraulic servo 26' for the second speed drive is supplied with the line pressure Pl via line 48d.

With an increase in vehicle speed, the governor pressure Pgo is increased. The governor pressure Pgo thus increased is applied from the port 96 to the land 94, thereby exerting an upward force through the medium of the valve element 92 to the valve element 68. In this manner, the valve element 68 is gradually moved upwardly. At this time, an upward force being exerted on the valve element 68 by the governor pressure Pgo is given as Pgo × S 94, wherein S94 designates the cross sectional area of the land 94.

When the valve element 68 is thus moved upwardly, the land 93 shuts off the communication between the port 96 and the land 94. Assuming that the cross sectional area of the land 93 is S93, then an upward force exerted on the valve element 68 by the governor pressure Pgo is increased to Pgo × S93 (> Pgo × S94). Almost simultaneously therewith, the input port 82 is communicated with the output port 84, so that the line pressure Pl is supplied from the output port 84 via line 48e to hydraulic servo 25' for the third speed drive, as well as via line 48g to the port 101. The line pressure Pl which has been supplied to the port 101 exerts an upward force on the valve element 68 due to a difference in cross sectional area between the land 97 and the stem 98. The upward force is represented by (Pl × S97). In this manner, the valve stem 68 is moved quickly or according to a snap action to its upper position 57B. In other words, the automatic transmission assumes the third speed drive position.

Upon third speed drive, the valve element 68 remains in the position 57B. Stated differently, the input port 82 is communicated with the output port 84, so that the line pressure Pl is supplied to the hydraulic servo 25' for the third speed drive.

With a decrease in vehicle speed, the governor pressure Pgo is lowered, so that the valve element 68 is displaced downwardly due to the throttle pressure Pth from the port 70 and the force of spring 67. When the valve element 68 is lowered a given distance, the land 94 is communicated with the port 96, so that an upward force acting on the valve element due to the governor pressure Pgo is lowered from (Pgo × S93) to (Pgo × S94). Almost simultaneously therewith, the input port 82 is shut off from communication with the output port 84, so that an upward force acting on the valve element 68 due to the line pressure Pl disappears. Accordingly, from this time on, the valve element 68 is instantaneously displaced to the lower position 57A.

Referring now to the operation of the 3-4 shift valve 58, during the third speed drive, the valve element 74 remains in the lower position 58A. At this time, an input port 89 is communicated with an output port 90, so that the hydraulic servo 12' is supplied with pressure.

With an increase in vehicle speed, the governor pressure Pgo is increased, so that the valve element 74 is gradually displaced upwardly. Assuming that a cross sectional area of a land 105 is S105, then an upward force acting on the valve element 74 due to the governor pressure Pgo is represented by (Pgo × S105). Assuming that a difference in cross sectional area between the land 103 and the land 102 is S103, then a downward force acting on the valve element 74 due to the line pressure Pl is given as (Pl × S103).

When the valve element is displaced a given distance upwardly, then the communication between the land 105 and the port 109 is shut off. Assuming that a cross sectional area of the land 106 is S106 (> S105), then an upward force acting on the valve element 74 due to the governor pressure Pgo is increased from (Pgo × S105) to (Pgo × S106). Almost simultaneously therewith, a downward force acting on the valve element 74 due to the line pressure Pl disappears. Thus, the valve element 74 is displaced to the upper position 58B instantaneously, so that the line pressure Pl is supplied to the hydraulic servo 19' for the overdrive.

During overdrive, the valve element 74 remains in the position 58B, so that the line pressure Pl is supplied to the hydraulic servo 19'.

With a decrease in vehicle speed, the governor pressure Pgo is decreased, so that the valve element 74 is displaced gradually downwardly.

When the valve element 74 is displaced a given distance downwardly, the land 105 is brought into communication with the port 109. Thus, an upward force acting on the valve element 74 due to the governor pressure Pgo is markedly lowered from (Pgo × S106) to (Pgo × S105). Almost simultaneously therewith, the input port 89 is communicated with an output port 90, so that a downward force (Pl × S104) due to the line pressure Pl is applied to the valve element 74. From this time on, the valve element 74 is instantaneously displaced to its lower position 58A.

As is apparent from the foregoing, a snap action may be achieved for valve elements in shift valve by utilizing governor pressure Pgo and line pressure Pl for a hydraulic servo on a high speed side or a hydraulic servo on a low speed side. In this case, if the snap action is caused merely by a combination of a change in cross sectional area of lands and governor pressure, then it would be difficult to achieve a compromise between both snap actions required for the upshift and downshift, because of the communication-lapping relationship of lands on a valve element. However, this may be solved by using a servo-snap action, in combination with a change in cross sectional area of lands plus the governor pressure, so that the hysteresis for the shift lines for upshift and downshift may be freely determined.

Meanwhile, according to the embodiment shown, the governor pressure Pgo and a hydraulic pressure for the hydraulic servo 25' on a high speed side, i.e., a pressure for the third speed drive and overdrive in the same direction as that of the governor pressure Pgo are utilized for the 2-3 shift valve 57, and in addition, the governor pressure Pgo and a hydraulic pressure for the hydraulic servo 12' on a low speed side i.e., a hydraulic pressure for the first to third speed drive in the opposite direction to the governor pressure Pgo are utilized for the 3-4 shift valve 58, thereby achieving a snap action. However, in contrast thereto, in place of a hydraulic pressure for the hydraulic servo 25' on a high speed side, a hydraulic pressure for the hydraulic servo 26' on a low speed side, i.e., a pressure for the second speed drive in the opposite direction of the governor pressure, may be used for the 2-3 shift valve. In addition, in place of the hydraulic pressure for the hydraulic servo 12' on a low speed side, a hydraulic pressure for the hydraulic servo 19' on a high speed side, i.e., a hydraulic pressure for the overdrive in the same direction as that of the governor pressure Pgo may be utilized for the 3-4 shift valve, with the same results.

While specific embodiments of the invention have been shown and described in detail to illustrate the application of the inventive principles, it will be understood that the invention may be embodied otherwise without departing from such principles.

What is claimed is:

1. A hydraulic control system for use in an automatic transmission, comprising:
   first frictional engaging means operable upon shifting to a low speed drive;
   a first hydraulic servo and means for applying a hydraulic pressure thereto for operating said first frictional engaging means;
   second frictional engaging means operable upon shifting to a high speed drive;
   a second hydraulic servo and means for applying a hydraulic pressure thereto for operating said frictional engaging means;
   a throttle pressure control valve for delivering a throttle pressure commensurate with the opening of an intake throttle valve;
   a governor pressure control valve for delivering a governor pressure commensurate with vehicle speed; and
   a shift valve for changing over a fluid path from said first hydraulic servo to said second hydraulic servo upon upshift of said transmission in response to said throttle pressure and governor pressure, and from said first hydraulic servo to said second hydraulic servo upon downshift of said transmission, said shift valve having a valve element displaceable between a first position and a second position which when displaced towards said first position has applied thereto said throttle pressure and when displaced towards said second position, has applied thereto said governor pressure plus a pressure which is supplied to said second hydraulic servo, only when said pressure is supplied thereto;
   said element in said shift valve when displaced a given distance from said first position towards said second position having applied thereto a hydraulic pressure for said second hydraulic servo whereupon the governor-pressure-acting area of said valve element is increased.

2. A hydraulic control system for use in an automatic transmission, comprising:
   first frictional engaging means operable when shifting to a low speed drive;
   a first hydraulic servo and means for applying a hydraulic pressure thereto for operating said first frictional engaging means;
   second frictional engaging means operable when shifting to a high speed drive;
   a second hydraulic servo including means for applying a hydraulic pressure thereto for operating said second frictional engaging means;
   a throttle pressure control valve for delivering a throttle pressure commensurate with the opening of an intake throttle valve;

a governor pressure control valve for delivering a governor pressure commensurate with vehicle speed; and a shift valve for changing over a fluid path from said first hydraulic servo to said second servo upon upshift of said transmission in response to said throttle pressure and said governor pressure, and from said first hydraulic servo to said a second hydraulic servo upon downshift of said transmission, said shift valve having a valve element displaceable between a first position and a second position which when displaced towards said first position has applied thereto said throttle pressure and a pressure being supplied to said first hydraulic servo only when said pressure is supplied thereto, and when displaced towards said second position, said element has applied thereto said governor pressure;

said element in said shift valve when displaced a given distance from said second position towards said first position having said pressure which is supplied to said first hydraulic servo acting thereon, whereupon a governor-pressure-acting area of said valve element is decreased.

* * * * *